(12) United States Patent
Jain et al.

(10) Patent No.: US 8,787,907 B2
(45) Date of Patent: Jul. 22, 2014

(54) FREQUENCY SELECTION AND TRANSITION OVER WHITE SPACE

(75) Inventors: Avinash Jain, San Diego, CA (US); Ahmed K. Sadek, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 383 days.

(21) Appl. No.: 12/756,648

(22) Filed: Apr. 8, 2010

(65) Prior Publication Data

US 2011/0250858 A1 Oct. 13, 2011

(51) Int. Cl.
*H04W 4/00* (2009.01)

(52) U.S. Cl.
USPC ........... 455/434; 455/120; 455/450; 455/455; 455/463; 455/444; 455/431; 370/328; 370/331; 370/491; 370/329; 370/500

(58) Field of Classification Search
USPC ......... 455/434, 120, 450, 455, 463, 436, 444, 455/431; 370/328, 331, 491, 500, 329
See application file for complete search history.

(56) References Cited

U.S. PATENT DOCUMENTS

| | | | |
|---|---|---|---|
| 2004/0029600 A1* | 2/2004 | Johnson et al. | 455/500 |
| 2007/0117537 A1 | 5/2007 | Hui et al. | |
| 2009/0221295 A1 | 9/2009 | Sahin et al. | |
| 2009/0286509 A1* | 11/2009 | Huber et al. | 455/410 |
| 2010/0022205 A1* | 1/2010 | Henry et al. | 455/95 |
| 2010/0069013 A1 | 3/2010 | Chaudhri et al. | |
| 2010/0124179 A1* | 5/2010 | Lee et al. | 370/252 |

FOREIGN PATENT DOCUMENTS

| | | |
|---|---|---|
| JP | 2009016900 A | 1/2009 |
| JP | 2011515916 A | 5/2011 |
| JP | 2012502546 A | 1/2012 |
| WO | WO2007031961 A2 | 3/2007 |
| WO | WO-2009111392 A2 | 9/2009 |
| WO | WO-2010027308 A1 | 3/2010 |

OTHER PUBLICATIONS

International Search Report and Written Opinion—PCT/US2011/031847, ISA/EPO—Jul. 13, 2011.

* cited by examiner

*Primary Examiner* — Nimesh Patel
(74) *Attorney, Agent, or Firm* — James K. O'Hare (57) ABSTRACT

A method of wireless communication includes determining at least one neighboring apparatus from which to obtain information, obtaining information related to a plurality of channels from the at least one neighboring apparatus, selecting a channel from the plurality of channels based on the obtained information, and transmitting on the selected channel.

16 Claims, 10 Drawing Sheets

FREQUENCY SELECTION AND TRANSITION OVER WHITE SPACE

BACKGROUND

1. Field

The following description relates generally to wireless communication and, more particularly, to frequency selection and transition over white space.

2. Background

White space refers to frequency spectrum that is not used by any licensed technology/primary user in many geographical locations. In the absence of a primary user, this frequency spectrum is available for use by any other user (i.e., secondary user) using any technology. A wide area network (WAN) deployment for secondary usage over white space frequencies (or cognitive frequencies) is fundamentally different from more traditional deployments because of two basic reasons: a) the same frequency (or channel) may not be available at all locations because of the presence of a primary user (such as TV signal or wireless microphone); and b) the same channel is shared by various devices using disparate technologies creating interference pattern that changes spatially and temporally. Even in local area network (LAN) deployments, the devices using disparate technologies can significantly interfere on white space over lower frequencies due to propagation characteristics over such frequencies. As an example, in the traditional WLAN deployment over 2.4 GHz frequencies, the signal attenuates significantly over long distances and through walls thereby allowing different secondary users to coexist in their coverage area. However over the VHF/UHF band, the signal attenuates very little over large distances and through the walls thereby creating significant interference between secondary users.

This compels a WAN/LAN to use frequencies that are locally available and have less interference from other devices. In a wireless WAN/LAN (WWAN/WLAN) environment, each base station (BS) (or Access Point) can be considered as a master device selecting a frequency that is best suited for the mobile stations in its vicinity. Each BS has a downlink (DL) coverage area which is the neighborhood around the BS where a mobile station (MS) when present can decode a minimum rate transmission from the BS and uplink (UL) coverage area where the MS when present can transmit at a minimum rate to the BS. The DL and UL coverage areas are a function of selected frequencies and the interference pattern resulting from unknown devices sharing the same frequencies.

Conceptually, Dynamic Frequency Selection (DFS) is a way for a master device to select an available channel where low interference is observed. However, a practical design of a DFS protocol presents various challenges because of the limited information available to entities involved in the DFS decision process.

SUMMARY

In an aspect of the disclosure, a method of wireless communication includes determining at least one neighboring apparatus from which to obtain information, obtaining information related to a plurality of channels from the at least one neighboring apparatus, selecting a channel from the plurality of channels based on the obtained information, and transmitting on the selected channel.

In an aspect of the disclosure, an apparatus for wireless communication includes means for determining at least one neighboring apparatus from which to obtain information, means for obtaining information related to a plurality of channels from the at least one neighboring apparatus, means for selecting a channel from the plurality of channels based on the obtained information, and means for transmitting on the selected channel.

In an aspect of the disclosure, a computer program product includes a computer-readable medium. The computer-readable medium includes code for determining at least one neighboring apparatus from which to obtain information, obtaining information related to a plurality of channels from the at least one neighboring apparatus, selecting a channel from the plurality of channels based on the obtained information, and transmitting on the selected channel.

In an aspect of the disclosure, an apparatus for wireless communication includes a processing system. The processing system is configured to determine at least one neighboring apparatus from which to obtain information, to obtain information related to a plurality of channels from the at least one neighboring apparatus, to select a channel from the plurality of channels based on the obtained information, and to transmit on the selected channel.

DETAILED DESCRIPTION

Various aspects of the novel systems, apparatus and methods are described more fully hereinafter with reference to the accompanying drawings. The teachings disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that that the scope of disclosure is intended to cover any aspect of the novel systems, apparatus and methods disclosed herein, whether implemented independently of or combined with any other aspect of the invention. For example, an apparatus may be implemented or a method may be practiced using any number of the aspects set forth herein. In addition, the scope of the invention is intended to cover such an apparatus or method which is practiced using other structure, functionality, or structure and functionality in addition to or other than the various aspects of the invention set forth herein. It should be understood that any aspect disclosed herein may be embodied by one or more elements of a claim.

Examples of apparatuses suitable for incorporating various aspects of the invention include, but are not limited to, a mobile station capable of operating in a wireless network. A mobile station may be referred to as user equipment, a mobile phone, a user terminal, a wireless terminal, a mobile device, a subscriber station, a wireless device, a wireless node, a terminal, an access terminal, a node, a handheld device, or some other suitable terminology. The various concepts described throughout this disclosure are intended to apply to all suitable apparatuses regardless of their specific nomenclature. Similarly a base station may be referred to as access point, point coordinating entity, or any apparatus that is responsible for control management within a wireless network.

Figure 1:
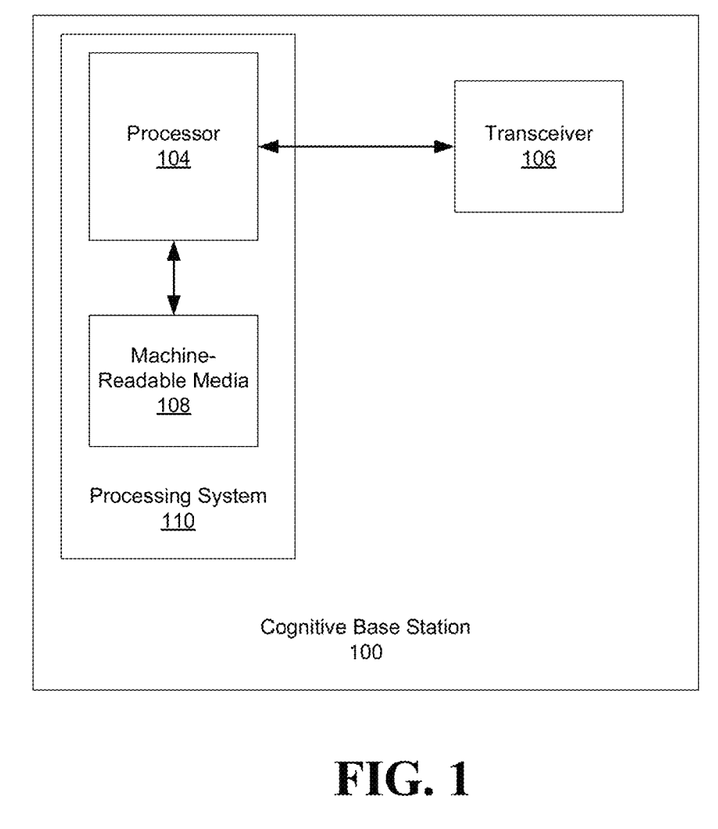
FIG. 1 is a block diagram illustrating a hardware configuration for an exemplary apparatus.

Various aspects of an apparatus will now be presented with reference to FIG. 1. FIG. 1 is a conceptual block diagram illustrating a hardware configuration for an apparatus. The apparatus 100 includes a processor 104, machine-readable media (memory) 108 coupled to the processor 104, and a transceiver 106 coupled to the processor 104. The processor 104 and the machine-readable media 108 may together be referred to as a processing system 110. However, the processing system 110 may include the processor 104 without the machine-readable media 108 for certain processor 104 configurations.

The processing system 110 may include one or more processors. The one or more processors may be implemented with any combination of general-purpose microprocessors, microcontrollers, a Digital Signal Processors (DSP), Field Programmable Gate Arrays (FPGA), Programmable Logic Devices (PLD), controllers, state machines, gated logic, discrete hardware components, or any other suitable entities that can perform calculations or other manipulations of information.

The processing system 110 may also include the machine-readable media 108 for storing software. Software shall be construed broadly to mean any type of instructions, whether referred to as software, firmware, middleware, microcode, hardware description language, or otherwise. Instructions may include code (e.g., in source code format, binary code format, executable code format, or any other suitable format of code). The instructions, when executed by the one or more processors, cause the processing system 110 to perform the various functions described below, as well as other protocol processing functions.

The machine-readable media 108 may include storage integrated into one or more of the processors. The machine-readable media 108 may also include storage external to the one or more processor, such as a Random Access Memory (RAM), a flash memory, a Read Only Memory (ROM), a Programmable Read-Only Memory (PROM), an Erasable PROM (EPROM), registers, a hard disk, a removable disk, a CD-ROM, a DVD, or any other suitable storage device. In addition, the machine-readable media 108 may include a transmission line or a carrier wave that encodes a data signal. Those skilled in the art will recognize how best to implement the described functionality for the processing system.

Figure 2:
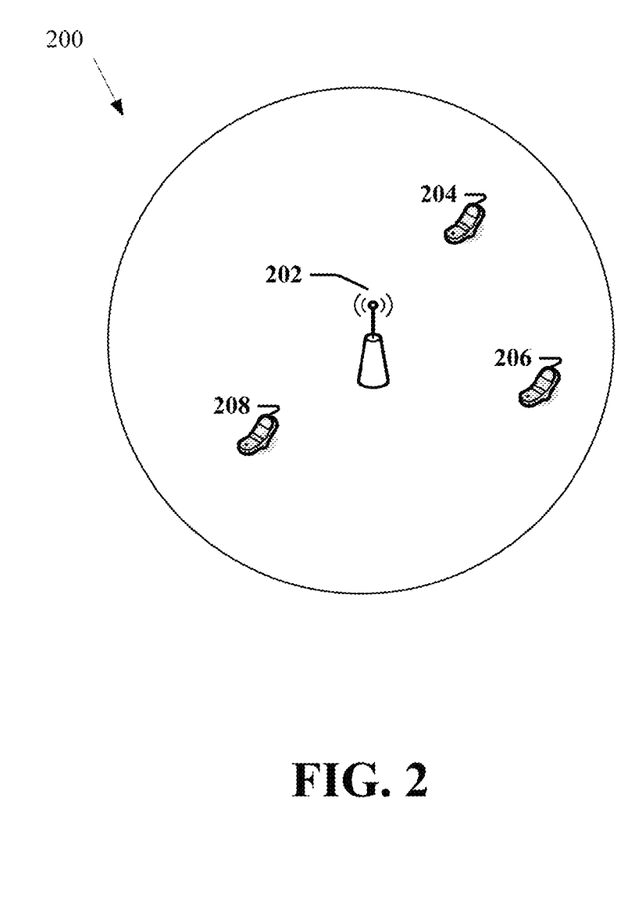
FIG. 2 is a diagram that illustrates two problems related to DFS.

FIG. 2 is a diagram 200 that illustrates two problems related to DFS. The first problem is related to initialization. Assume a BS 202 has no MS connected to it. In a traditional system, the BS 202 broadcasts a pilot or a signature waveform on one of the known frequency channels. The MS determines the strength of the signature waveform on all channels before the MS connects to the BS 202. However, in absence of feedback from the MS in its coverage area, the BS 202 does not know in advance the best channel to use among the available channels. The determination of the best channel at the BS alone is not representative of the channel strength at the MS. An obvious solution is to broadcast a signature sequence on each available white space channel. However, such broadcasting is counterproductive as it consumes power and creates interference on each channel for other white space devices. The second problem is related to dynamic changes in requirements from a serving BS 202. Assume the BS 202 is connected to MS 204 and MS 206. The MS 204 may enter into an area of increased interference from other devices. A new MS, MS 208, with a small pathloss to the BS 202 may want to connect to the BS 202. If the BS 202 is serving the MSs with a frequency that is not suitable for MS 204 and MS 208, how do MS 204 and MS 208 determine a new channel more suitable for their needs, how does MS 208 communicate its signal strength to the BS 202, and how does the BS 202 enable a change in operational frequency without disturbing the call quality of MS 206? In the case of a frequency division duplexing (FDD) WWAN/WLAN deployment, these two problems need to be addressed for both DL and UL.

Deployment Scenarios

Figures 3A, 3B:
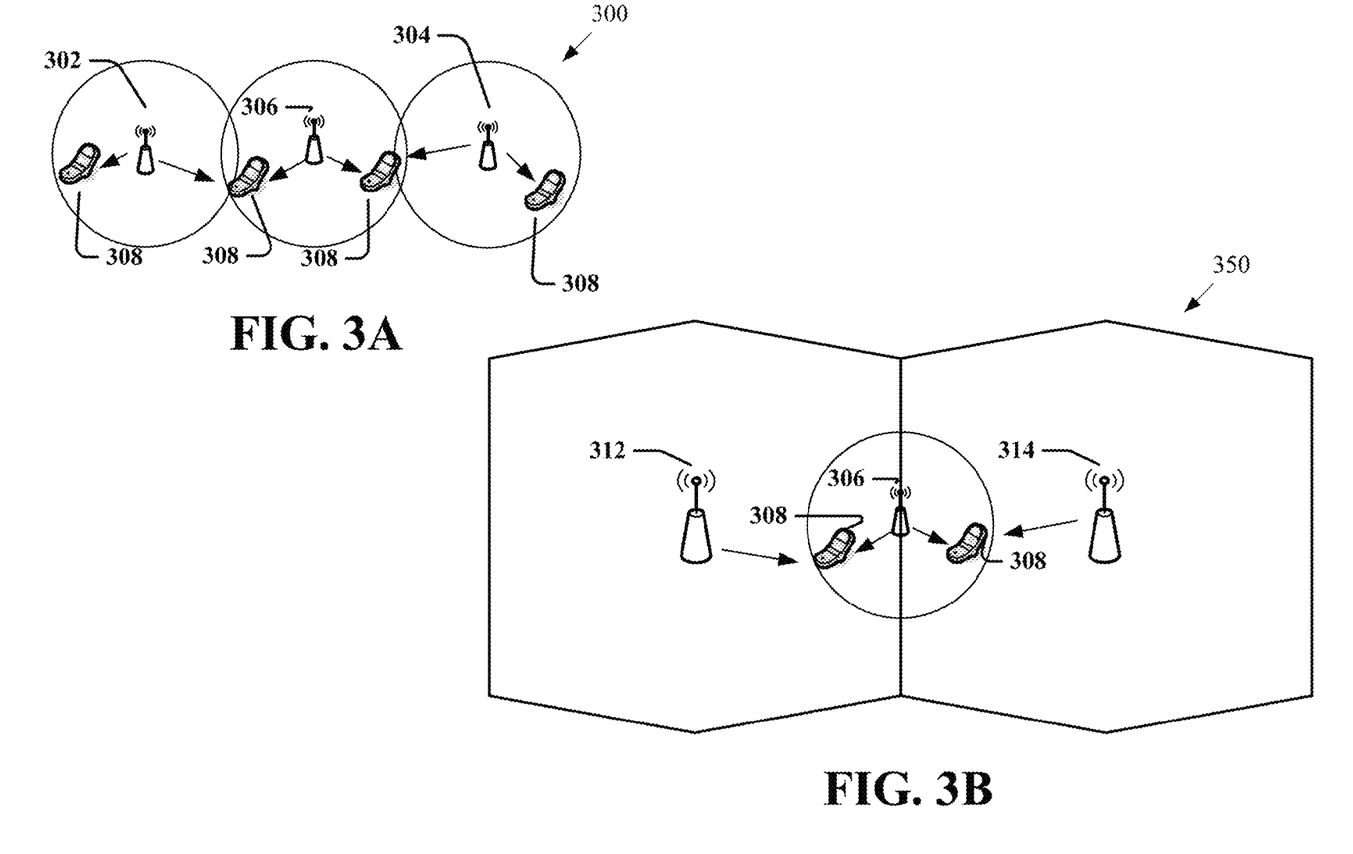
FIG. 3A is a diagram illustrating a first deployment scenario.
FIG. 3B is a diagram illustrating a second deployment scenario.

FIG. 3A is a diagram 300 illustrating a first deployment scenario. The first deployment scenario, which may be referred to as a "greenfield operation," is one in which a WWAN/WLAN 306 is deployed among other WWAN/WLAN stations 302, 304 on white space frequencies (e.g., TV UHF band). White space frequencies are a non-licensed band of frequencies. The MSs 308 are in communication with the WWAN/WLAN 306 through a service provider who does not own a licensed spectrum in the deployment region (i.e., there are no macro base stations in the deployment region that receive and transmit on a licensed band and are owned by the service provider).

FIG. 3B is a diagram 350 illustrating a second deployment scenario. The second deployment scenario, which may be referred to as "capacity offload and femto deployment," is characterized by the presence of a wireless deployment on licensed frequency. In the second deployment scenario, a BS 306 that is receiving and transmitting on white space with MSs 308, is deployed among macro BSs 312, 314, which receive and transmit on a licensed band and are owned (and therefore controlled) by the service provider of the BS 306. The frequency on the licensed band will be called an anchor frequency and each of the physical macro BS entities 312, 314 will be called an anchor BS. Capacity offload is a hot spot deployment on white space. The BS entity 306 receiving and transmitting on white space will be called cognitive BS and the selected frequency will be called cognitive frequency. The anchor carrier is reliable while the cognitive carrier's availability is uncertain. Femto deployment is a special case of capacity offload where the BS 306 is located inside a building and transmits at a low power with an antenna height similar to that of MS entities.

The cognitive BS may or may not be co-located with the anchor BS. Any solution that is applicable to the first deployment scenario (FIG. 3A) is also applicable to the second deployment scenario (FIG. 3B), as the cognitive BS 306 will have access to additional information provided by the anchor BSs 312, 314. As such, the availability of an anchor BS provides alternatives that are simpler and more reliable.

Initialization

Figures 4A, 4B:
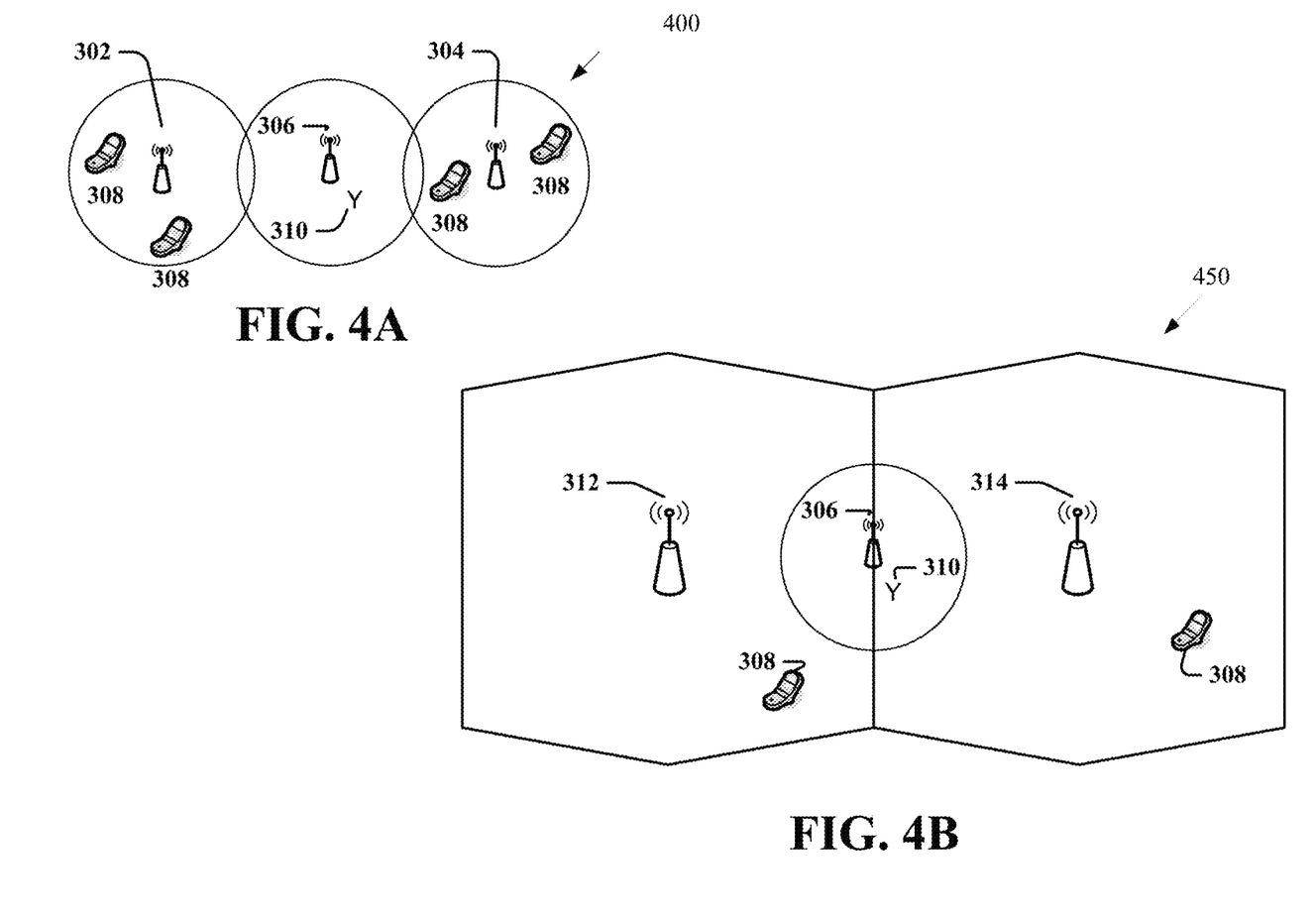
FIG. 4A is another diagram illustrating the first deployment scenario.
FIG. 4B is another diagram illustrating the second deployment scenario.
Figure 5:
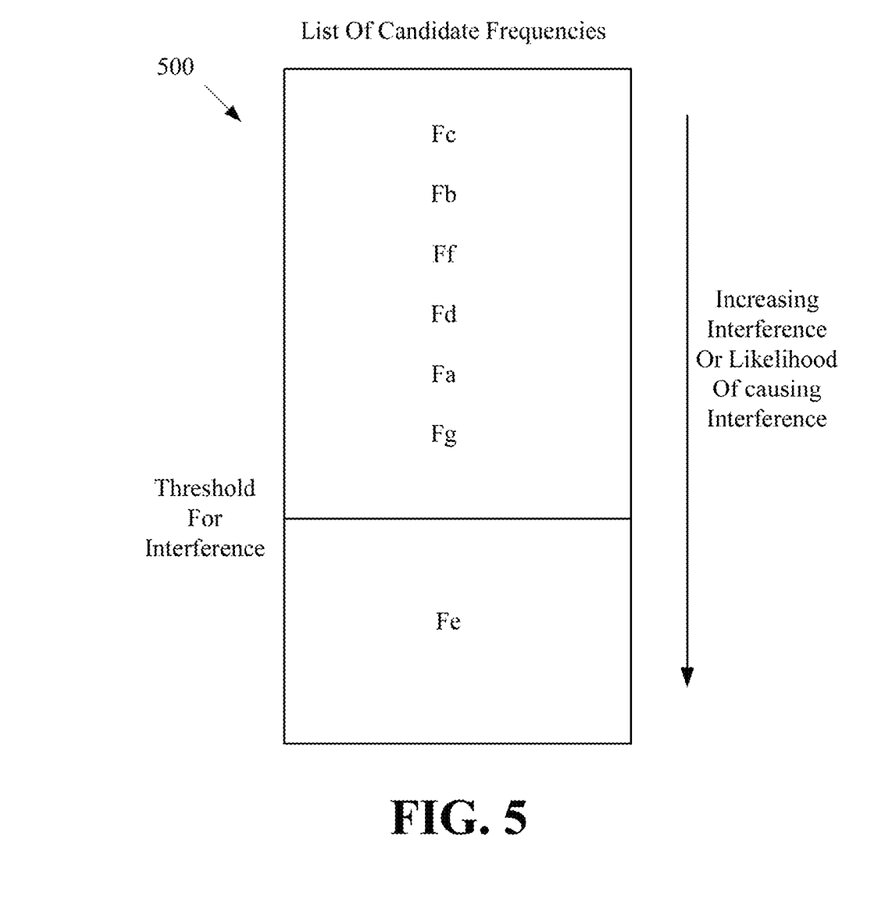
FIG. 5 is a diagram showing a list of candidate frequencies.

FIG. 4A is another diagram 400 illustrating the first deployment scenario. FIG. 4B is another diagram 450 illustrating the second deployment scenario. FIG. 5 is a diagram 500 showing a list of candidate frequencies. Referring to FIG. 4A, in the first deployment scenario (i.e., greenfield operation), the BS 306 obtains (1) frequencies selected by neighboring BSs 302, 304 and (2) interference (i.e., energy) associated with a set of frequencies $f_{set}$. With respect to the information (1), the frequencies selected by the neighboring BSs 302, 304 can be communicated to the BS 306 over the backhaul (if they are connected), or can be learned through sensing the wireless medium and identifying the set of frequencies used by those neighboring BSs 302, 304. To learn through sensing the wireless medium, the BS 306 can decode the broadcast channels or some signature sequences that contain the BSs' IDs from the neighboring BSs 302, 304. With respect to the information (2), the interference/energy associated with each frequency in a set of frequencies $f_{set}$ can be obtained from other base stations or from fixed receive antennas, such as antenna 310, at the height of an MS (about 2 m high). The antenna 310 can be deployed in the immediate neighborhood of the BS 306 and the interference on the set of frequencies $f_{set}$ can be measured at each frequency f in the available white space (i.e., at each frequency f in the set $f_{set}$). As an example, while the transmit antenna of the BS 306 is at around 10-15 m from the ground, a receive antenna 310 can be installed at a height of approximately 2 m from the ground where the BS 306 is located. When information (2) is received from another base station, the set of frequencies $f_{set}$ may be the result of an LCF constructed by the base station, which may be another cognitive base station.

Referring to FIG. 5, with the information obtained from neighboring BSs 302, 304 and interference information obtained from the antenna 310, the BS 306 can create a list of candidate frequencies (LCF) 500 in an increasing order of interference or likelihood of causing interference. Note that LCF can be created by any entity on the network on behalf of BS 306 as long as information can be conveyed to that entity over the backhaul. The list may be sorted in any number of ways. In one example, each frequency can be assigned a number based on the interference measured for that frequency and an amount can be subtracted from that number if neighboring BSs are using that frequency. The set of frequencies can be sorted based on the resulting number. More specifically, a particular frequency may have no interference, and therefore be assigned a 10, but if two neighboring base stations are using the particular frequency, −1 can be subtracted for each such neighboring base stations, thus providing a sum of 8, which can be used to compare with other candidate frequencies in order to be sorted in the LCF.

Once sorted, the frequencies f in which the interference or likelihood of interference is greater than a threshold are removed from the LCF, as the interference observed or likelihood of interference predicted is higher than a tolerable threshold. As shown in FIG. 5, frequency $F_e$ is removed for having an interference or likelihood of interference greater than the threshold.

Depending on the needs of the network, the following two opposite objectives could be achieved with the information (1) (i.e., frequencies selected by neighboring BSs):

a) A frequency that is not used by a neighboring BS (or used the least) is selected from the LCF. This approach reduces the interference effect of neighboring BSs and is preferred when the objective is to increase the coverage area of BSs belonging to the same network.

b) A frequency that is used the most by neighboring BS is selected from LCF. This is done when the objective is to reduce the inter-frequency handoff in case of highly mobile network deployment. This kind of deployment helps a network service provider provide higher mobility at the cost of increased interference between the cells.

The algorithm, as discussed supra, can be easily adapted in case only partial information is available to the BS 306. For example in the absence of information (1), the BS 306 may select the frequency with the least measured interference, as measured by antenna 310. Similarly in the absence of information (2), LCF can be the list of all available frequencies ranked in order of least used to most used frequencies and the BS 306 may select the frequency depending on the objectives a) or b). In the presence of both information (1) and (2), the BS 306 can select the top candidate in the LCF, assuming the frequencies are prioritized by balancing the information received in (1) and (2). The initialization algorithms described above can also be utilized in case of unplanned user-deployment models in which the BS is a portable device, for example a femto cell deployment.

Referring to FIG. 4B, in the second deployment scenario (i.e., capacity offload and femto deployment), the algorithm for frequency selection can be refined by using the information collected from MSs 308 connected to the anchor BSs 312, 314. Each cognitive BS 306 maintains a list of associated anchor BSs. An anchor BS is in the list if the transmission from the anchor BS can be reliably decoded in the "desired" coverage area of the cognitive BS 306. Because the coverage area of cognitive BS 306 is a function of the interference pattern on the operating white space frequency, the word "desired" is used to describe the DL/UL coverage area the network service provider wants the cognitive BS 306 to be able to provide for reliable service.

There are multiple ways for the cognitive BS 306 to create and to maintain a list of the anchor BSs. In one example, the list contains anchor BSs as follows:

I. In case of a planned deployment (see FIG. 4B), the locations and coverage areas of both the anchor BSs and cognitive BSs are known. When there is a significant overlap in the coverage areas of the two, the anchor BSs can be added to the list. Accordingly, as shown in FIG. 4B, anchor BSs 312, 314 are added to the list.

II. In case of unplanned deployment, the strength of the received signal at licensed frequencies from different anchor BSs, which includes anchor BSs 312, 314 are measured at the cognitive BS 306. The signal strength can be measured by a receive antenna, such as antenna 310, installed at a height of approximately 2 m from the ground where the cognitive BS 306 is located. If the signal strength from an anchor BS is above a threshold, the anchor BS is added to the list. In such a configuration, if the signal strength of anchor BS 312 is above a predetermined threshold, but the signal strength of anchor BS 314 is below the predetermined threshold, anchor BS 312 is added to the list and anchor BS 314 is not added to the list.

The size of associated anchor BS list can be controlled to a maximum size containing only the anchor BSs whose signals are received at strengths higher than the predetermined signal strength threshold, which is higher than the signal strengths from the anchor BSs not on the list.

Given the associated anchor BS list, the cognitive BS 306 can also obtain, in addition to the information (1) and (2), as discussed supra, the following information (3): The cognitive BS 306 receives, over the backhaul, from each anchor BS in its association list, a set of candidate white space frequencies that are desirable. An anchor BS obtains this desirable list of candidate frequencies by requesting the MSs connected to the anchor BS to measure and to report the interference over the set of frequencies $f_{set}$. To reduce the measurement overhead of an MS connected to an anchor BS, the cognitive BS 306 can provide the LCF to an associated anchor BS through which the cognitive BS 306 wants more information. The frequencies over which a high value of interference is reported by many MSs connected to the anchor BS can be removed from the list of candidate frequencies.

Referring again to FIG. 4A, the cognitive BS 306 may also obtain information (3) from neighboring cognitive BSs 302, 304. In such a configuration, the cognitive BS 306 receives over the backhaul from cognitive BSs 302, 304 a list of desirable white space frequencies. The cognitive BSs 302, 304 obtains the desirable list of candidate frequencies by requesting the MS 308 to which each of the cognitive BSs are communicating to measure and to report the interference over the set of frequencies. The cognitive BSs 302, 304 may report the information obtained or may construct an LCF and report the constructed LCF to the cognitive BS 306.

Given the modified LCF after modifications based on information received from associated anchor BSs, the cognitive BS 306 can implement steps (a) or (b) to select the frequency. The initialization steps are similar for selection of DL and UL frequencies in case of a FDD system.

Changes to Operational Frequency

Figure 6:
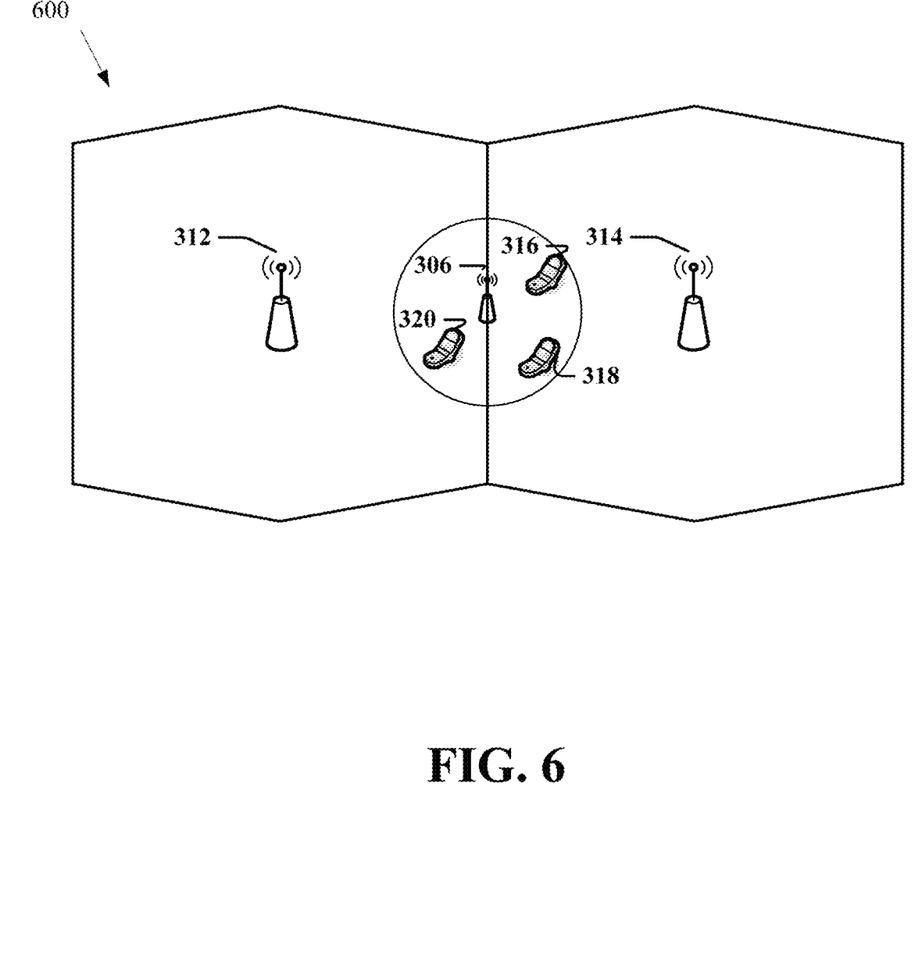
FIG. 6 is a diagram illustrating changes to an operational frequency.

FIG. 6 is a diagram 600 illustrating changes to an operational frequency. Assume the cognitive BS 306 has selected a DL frequency $f_o$ and is connected to MS 316 and MS 318 over this frequency. The frequency $f_o$ is the operational frequency. The cognitive BS 306 is transmitting a pilot or signature waveform on frequency $f_o$.

There may be other mobile stations such as MS 320 that may wish to connect to the cognitive BS 306, however they may be in coverage holes at frequency $f_o$ due to a high interference from other devices. To enable a transition to a different operational frequency, the cognitive BS 306 has to ensure that its connection with MS 316 and MS 318 is not adversely affected or dropped because of this change.

Figure 7:
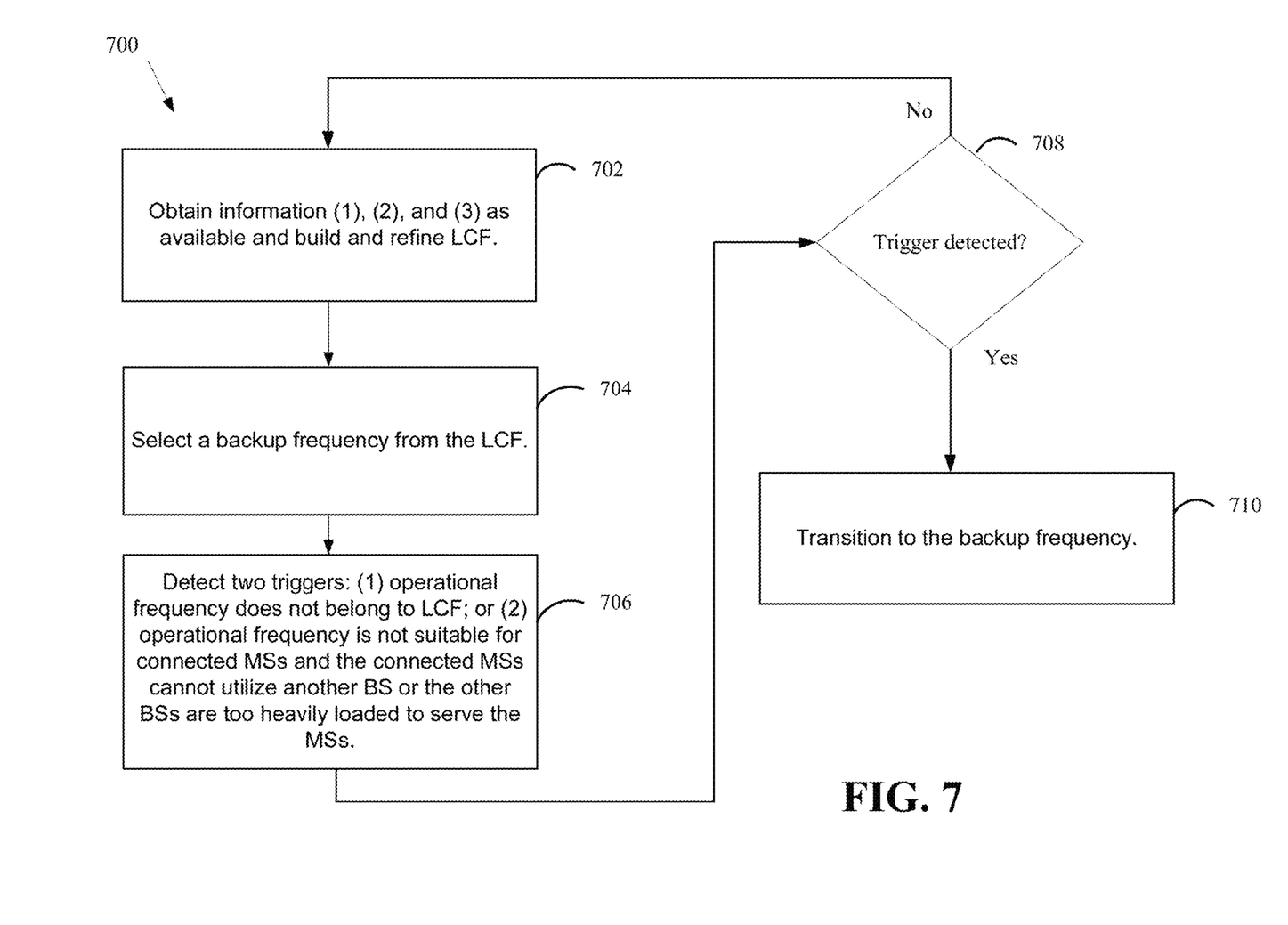
FIG. 7 is a flow chart of an exemplary method.

FIG. 7 is a flow chart 700 of an exemplary method.

$1^{st}$ Step:

In a first step 702, the cognitive BS 306 can periodically obtain all the information (1), (2), and (3) as discussed supra. In the presence of an anchor BS (such as anchor BSs 312, 314), the information (3) can be refined by the anchor BS by requesting MSs connected to the anchor BS to measure the signal to noise ratio (SNR) of the signature waveform transmitted by cognitive BS 306. If certain number of MSs report high received SNR on the signature waveform, then the operational frequency $f_o$ will be included in the list of candidate frequencies given by the associated anchor BS to the cognitive BS 306.

The LCF is further refined by the cognitive BS 306 by requesting the MS 316 and MS 318 to perform interference measurements on some or all of the frequencies in the LCF (feLCF).

$2^{nd}$ Step:

In a second step 704, the cognitive BS 306 selects a backup frequency $f_b$ from the LFC.

$3^{rd}$ Step:

In a third step 706, two triggers are detected: (1) operational frequency does not belong to LCF; or (2) operational frequency is not suitable for connected MSs and the connected MSs cannot utilize another BS or the other BSs are too heavily loaded to serve the MSs. The following triggers lead the cognitive BS 306 to find and to switch to a new operational frequency:

i. The frequency $f_o$ does not belong to LCF; or ii. The MS 316 or MS 318 measures and reports a low SNR at frequency $f_o$ on the signature waveform of the cognitive BS 306 and there is no other BS (cognitive or anchor) in the neighborhood of the cognitive BS 306 whose signature waveform is received at a desirable level by the MS 316 and MS 318.

The trigger i) tells the cognitive BS 306 that there may be other MSs such as MS 320 that may wish to connect to it, but that they can not because of interference observed by them. The trigger ii) tells the cognitive BS 306 that the call quality of the MSs connected to the cognitive BS 306 may no longer be good and that there is no nearby BS that can provide reliable service to the MSs. The trigger ii) can also be activated in the presence of an anchor BS (transmissions from which can be decoded) that is heavily loaded, and therefore unable to serve the MSs.

If the trigger is detected 708, then the cognitive BS 306 goes to a $4^{th}$ Step 710, otherwise the cognitive BS 306 repeats the $1^{st}$ through $3^{rd}$ Steps 702, 704, 706 periodically.

$4^{th}$ Step:

In a fourth step 710, the cognitive BS 306 transitions to the backup frequency $f_b$. There are two options depending on the complexity of the transmitter at cognitive BS 306:

a) To enable a transition to backup frequency $f_b$, the cognitive BS 306 can transmit a pilot or signature waveform on frequency $f_b$. This signature can be transmitted in addition to the transmission at the frequency $f_o$. The MS 316 and the MS 318 connected to the cognitive BS 306 are then instructed by the cognitive BS 306 to perform measurements on frequency $f_b$ and report the SNR measured at the MS receive antenna. If the SNR is greater than a threshold for all MS connected to the cognitive BS 306, then the cognitive BS 306 can instruct the MS connected to it to transition to a frequency $f_b$ and to stop the transmission at frequency $f_o$. The frequency $f_b$ will then become the new operational frequency. In case the SNR on frequency $f_b$ reported by few MS connected to the cognitive BS 306 is lower than the threshold, the cognitive BS 306 has two options: a) the cognitive BS 306 can exclude $f_b$ from the LCF and repeat the steps of the algorithm; or b) if only a very few MS report low SNR on $f_b$ as compared to larger number of MS reporting low SNR on frequency $f_o$, the cognitive BS 306 may still decide to transition to the backup frequency $f_b$. Note that this is a rare event as $f_b$ is selected from LCF which was refined based on measurements reported by MS connected to the cognitive BS 306.

b) In case the complexity restrictions at the BS transmitter do not allow the cognitive BS 306 to transmit two simultaneous signature waveforms on two different frequencies, the cognitive BS 306 may decide to perform a blind switch to frequency $f_b$ and instruct the MSs connected to it to tune their receivers at some later time. Because MS 316 and MS 318 had reported relatively low values for the interference on $f_b$, it is expected that SNR of the signature waveform transmitted on $f_b$ will be higher than the SNR of the signature waveform transmitted on $f_o$.

In case of a FDD system, the UL backup frequency can be directly selected by the cognitive BS 306 based on the interference change at the BS receive antenna.

Further Enhancements

In the methods discussed above, the complexity was kept very similar to the current WWAN deployments. Given the unreliability of a selected white space frequency in the "desired" coverage area of the cognitive BS 306, it may not be sufficient to transmit at a single frequency. Multi-channel Dynamic Frequency Selection (M-DFS) has been proposed as a conceptual means to select two or more frequencies.

Here we present practical designs that try to balance complexity and cost against the merits of M-DFS. Note that multiple frequencies from the LCF can be selected to satisfy some criterion. An example of a two channel DFS would be selection of two frequencies $f_o$ and $f_b$ as discussed supra.

Figure 8:
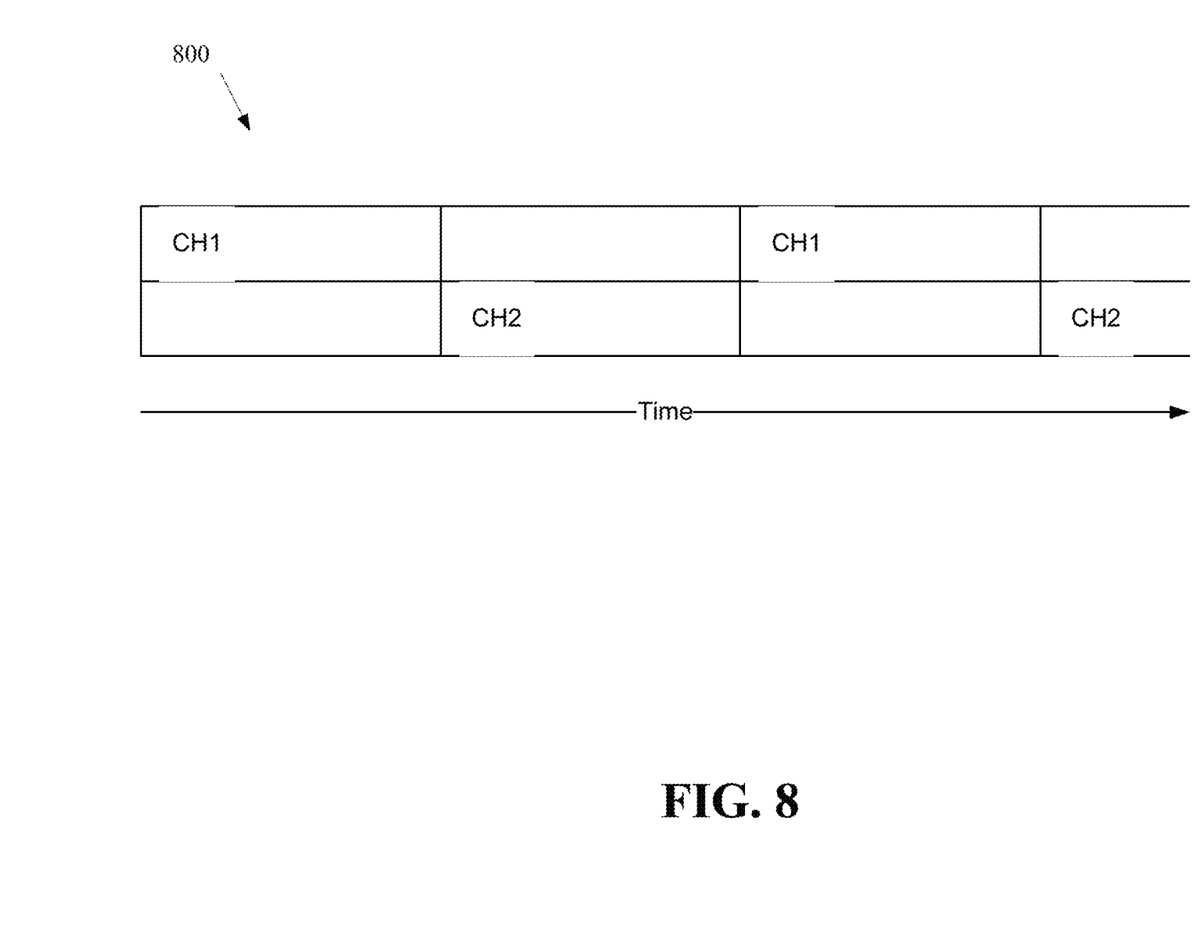
FIG. 8 is a diagram illustrating a frequency (carrier) of transmission.

FIG. 8 is a diagram 800 illustrating a frequency (carrier) of transmission. One possible option is that the cognitive BS 306 simultaneously transmits over multiple frequencies. However a pragmatic choice is to change the frequency of transmission periodically between the multiple frequencies as shown in FIG. 8 (two channel DFS illustration). Two possible options of low complexity are:

a) The cognitive BS 306 shifts its transmission frequency periodically. The times during which the cognitive BS 306 is transmitting on a particular frequency are broadcasted and are known to the associated anchor BSs. The MS connected to an anchor BS may or may not re-tune and listen to all the frequencies. In cases where the MS may retune to the second frequency, the dedicated control channels such as the Paging Indicator and ACK/NACK that are meant for a particular MS, are transmitted on all frequencies to which the MS retunes.

b) Frequency and time tracking are made easier for the receivers by transmitting a pilot or signature waveform at all frequencies continuously (and hence simultaneously).

The option b) is suitable in a deployment with MS having receivers of low complexity that do not retune between different frequencies. If the MS receivers are multicarrier capable (has two or more receive chains), the MS can receive simultaneously on two carriers. If one of the carriers has a higher reliability then the control channels should be transmitted on this carrier. An example of a scenario where one of the carriers has a higher reliability is the second deployment scenario (i.e., capacity offload and femto deployment) in which an anchor carrier is available. In this case, the MS can continue to receive the control channel on the anchor carrier where the interference environment is more controlled.

Figure 9:
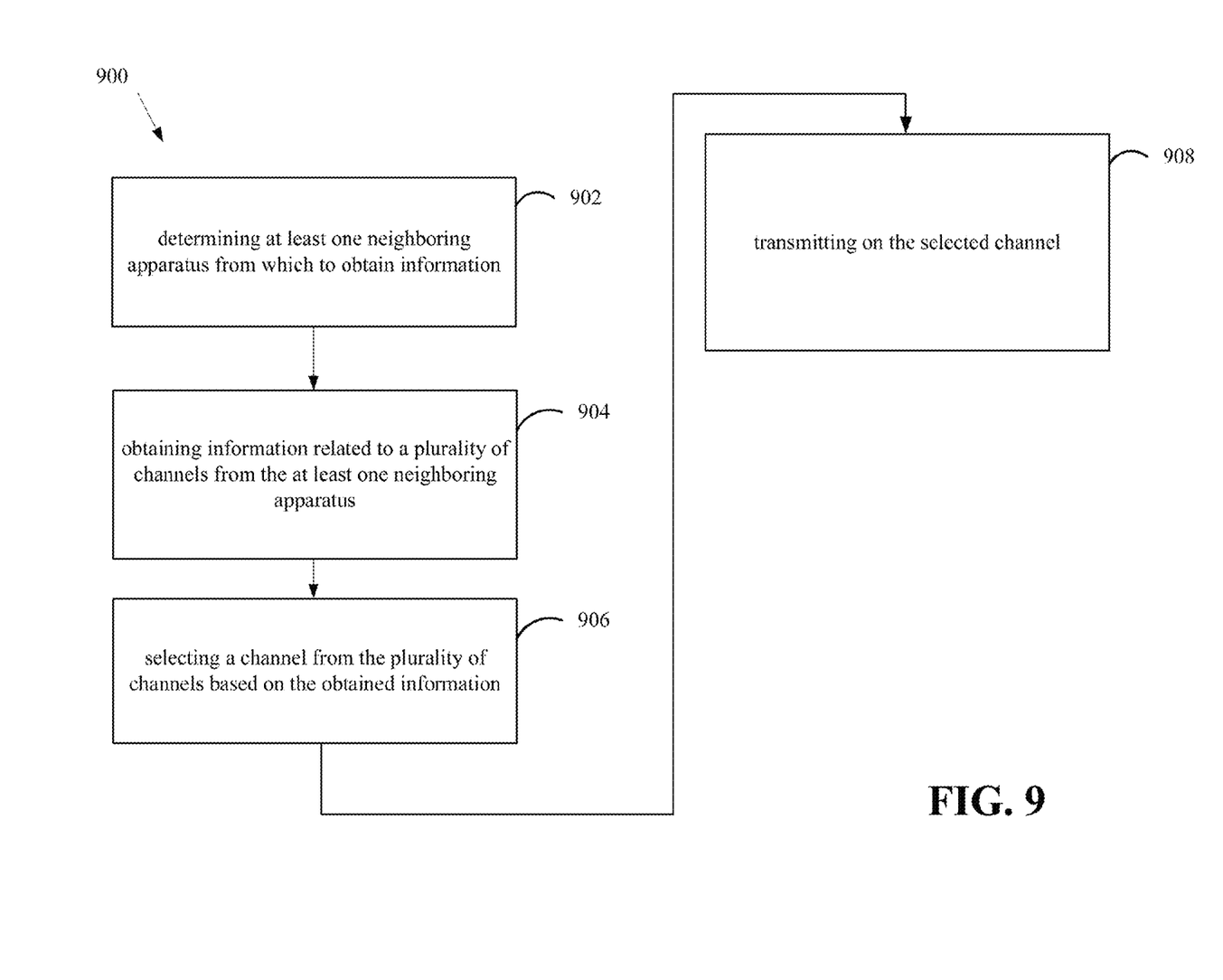
FIG. 9 is another flow chart of an exemplary method.

FIG. 9 is a flow chart 900 of an exemplary method. The method includes determining at least one neighboring apparatus from which to obtain information (902), obtaining information related to a plurality of channels from the at least one neighboring apparatus (904), selecting a channel from the plurality of channels based on the obtained information (906), and transmitting on the selected channel (908). The at least one neighboring apparatus may be determined from a list of fixed apparatuses whose physical location is known. The at least one neighboring apparatus may be determined based on a strength of a signature waveform transmitted on a wireless channel. The at least one neighboring apparatus may be determined based on communication with the at least one neighboring apparatus over a wireless channel. In one configuration, the method further includes relaying information on the selected channel to another apparatus, such as another cognitive base station. In one configuration, the selected channel is a backup channel and the method further comprises selecting a primary channel. In one configuration, the obtained information is a set of channels determined to have low interference by the at least one neighboring apparatus. In one configuration, the method further includes selecting an additional channel from the plurality of channels based on the obtained information. The transmitting is also on the additional channel. In one configuration, the transmitting is alternated between said channel and said additional channel. In one configuration, the transmitting includes transmitting a pilot signal consecutively on each of said channel and said additional channel and transmitting data alternately on said channel and said additional channel.

In one configuration, the method further includes initiating a transmission on a first channel. The selected channel is a second channel different from the first channel. The method further includes transitioning from the first channel to the second channel based on a predefined criteria by stopping the transmission on the first channel and initiating a transmission on the second channel. In one configuration, the transmission on the first channel includes information about the second channel. Including information about the second channel in the transmission on the first channel will allow MSs receiving the transmission to know the second channel upon a transition from the first channel to the second channel. In one configuration, the information is obtained from at least one neighboring apparatus. In one configuration, the obtained information includes a channel on which at least one neighboring apparatus is transmitting. In one configuration, the obtained information includes a set of channels that at least one neighboring apparatus determined to have an interference below a threshold. In one configuration, the second channel is selected when the first channel is not in the set of channels. In one configuration, the second channel is selected when the second channel is determined to be better than the first channel based on the obtained information. In one configuration, the second channel is selected to be the same as a channel used for transmission by a neighboring apparatus. In one configuration, the second channel is selected to be different than a channel used for transmission by a neighboring apparatus.

In one configuration, the first channel is a first white space frequency and the second channel is a second white space frequency. The method may further include arranging the white space frequencies into a set of white space frequencies based on the obtained information. In one configuration, the second white space frequency is selected from the set of white space frequencies and the predefined criteria is satisfied when the first white space frequency is not in the set of white space frequencies. In one configuration, the first white space frequency is an operational white space frequency and the second white space frequency is a backup white space frequency. In one configuration, the method further includes receiving information from at least one wireless terminal on a signal quality related to the first white space frequency. The predefined criteria may also be satisfied when the signal quality is below a threshold and the at least one wireless terminal is not handed over to another base station. In one configuration, the obtained information includes at least one selected from the group consisting of a white space frequency selected by each of at least one neighboring base station; first interference information for each of the plurality of white space frequencies, the first interference information being obtained by at least one receive antenna positioned at a height to obtain interference to wireless terminals; and second interference information for each of the plurality of white space frequencies, the second interference information being obtained from the at least one neighboring base station through measurements of wireless terminals served by the at least one neighboring base station. In one configuration, the height is about two meters.

In one configuration, the obtained information includes a selected white space frequency of each of at least one neighboring base station and interference information for each of the plurality of white space frequencies, and the arranging into the set of white space frequencies includes building a list of candidate frequencies containing the plurality of white space frequencies; determining a value ranking for each white space frequency in the list of candidate frequencies based on how many of the at least one neighboring base station selected the white space frequency and based on the interference information for the white space frequency; sorting the white space frequencies in the list of candidate frequencies in an order based on the value rankings of the white space frequencies;

and narrowing the list of candidate frequencies to the set of white space frequencies by removing white space frequencies from the list of candidate frequencies that are beyond a threshold.

In one configuration, the selected second white space frequency is a highest arranged white space frequency in the set of white space frequencies. In one configuration, the method further includes transmitting a pilot signal on the second white space frequency; instructing at least one wireless terminal to determine a signal quality of the pilot signal; and receiving the signal quality of the pilot signal from each of the at least one wireless terminal. In one configuration, the transitioning from the first white space frequency to the second white space frequency occurs when the signal quality received from each of the at least one wireless terminal is greater than a threshold. In one configuration, the method further includes removing the second white space frequency from the set of white space frequencies when the signal quality is less than a threshold for one or more of the at least one wireless terminal; and selecting a new second white space frequency from the set of white space frequencies to replace the removed second white space frequency.

Figure 10:
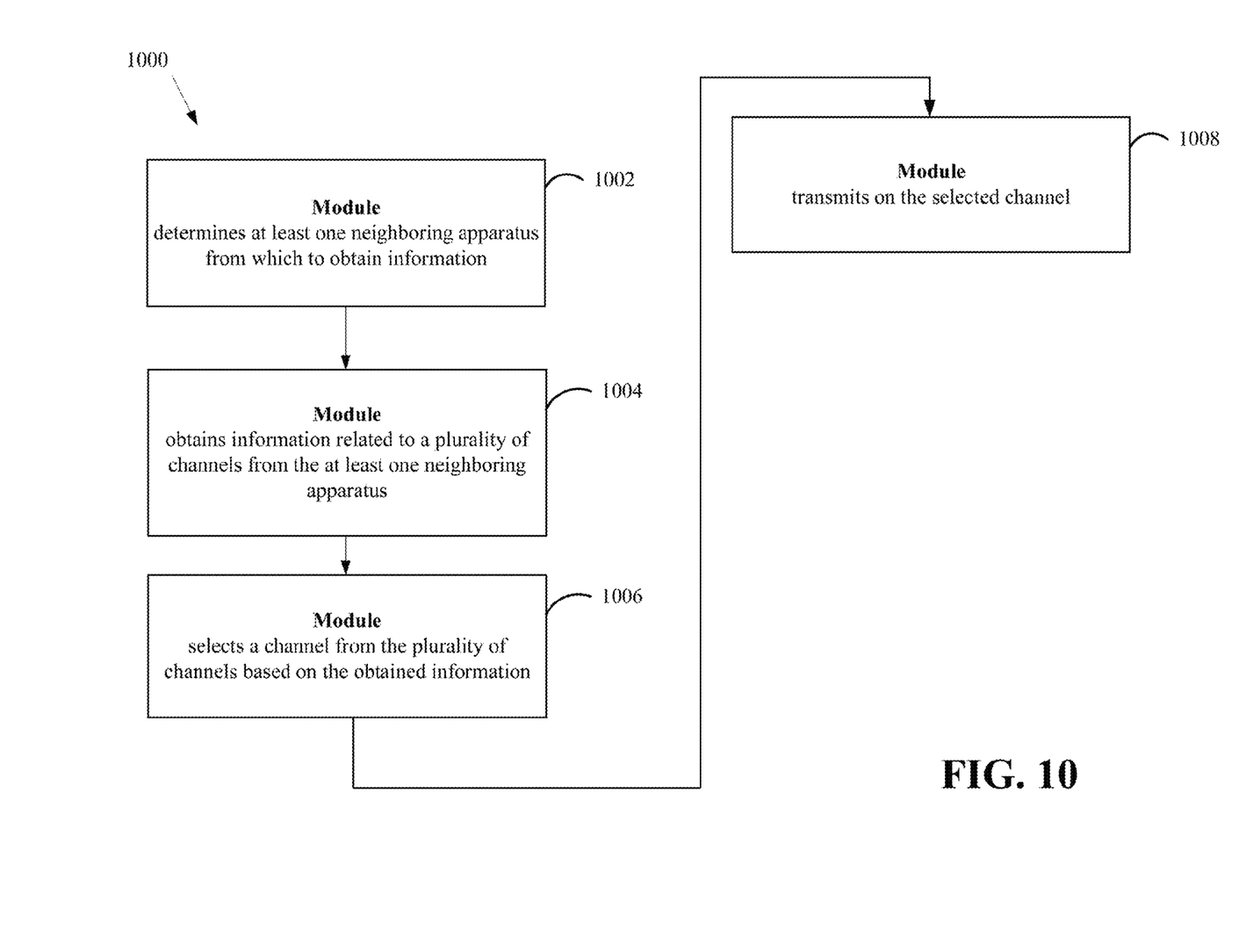
FIG. 10 is a modular diagram of an exemplary apparatus.

FIG. 10 is a modular diagram 1000 of an exemplary apparatus 100. The exemplary apparatus 100 a module 1002 that determines at least one neighboring apparatus from which to obtain information, a module 1004 that obtains information related to a plurality of channels from the at least one neighboring apparatus, a module 1006 that selects a channel from the plurality of channels based on the obtained information, and a module 1008 that transmits on the selected channel.

A protocol and a design have been provided to select and to switch the white space frequency of operation based on collected information in a WAN deployment setting. In one configuration, an apparatus includes means for determining at least one neighboring apparatus from which to obtain information, means for obtaining information related to a plurality of channels from the at least one neighboring apparatus, means for selecting a channel from the plurality of channels based on the obtained information, and means for transmitting on the selected channel. The aforementioned means is the processing system 110 of the cognitive base station configured to perform the function identified in each of the aforementioned means. Specifically, the aforementioned means in the processor 104 configured to perform the function identified in each of the aforementioned means.

The previous description is provided to enable any person skilled in the art to fully understand the full scope of the disclosure. Modifications to the various configurations disclosed herein will be readily apparent to those skilled in the art. Thus, the claims are not intended to be limited to the various aspects of the disclosure described herein, but is to be accorded the full scope consistent with the language of claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method of wireless communication of a cognitive base station transmitting on an operational channel, comprising:
   obtaining information corresponding to, 1) for each of a plurality of neighboring base stations, a white space channel selected by the respective neighboring base station, and 2) interference measurements for each of the plurality of selected white space channels;
   creating a list of candidate white space channels based on a value ranking for each of the plurality of selected white space channels, wherein the value ranking of a respective white space channel is based on the number of neighboring base stations that selected the respective white space channel and the interference measurements for the respective white space channel, and the list is in an order of interference or likelihood of causing interference;
   selecting a backup channel from the list of candidate white space channels; and
   transitioning from the operational channel to the backup channel based on a predefined criteria by stopping the transmission on the operational channel and initiating a transmission on the backup channel.

2. The method of claim 1, wherein the predefined criteria is satisfied when the operational channel is not in the list of candidate white space channels.

3. The method of claim 1, further comprising receiving information from at least one wireless terminal on a signal quality related to the operational channel, wherein the predefined criteria is satisfied when the signal quality is below a threshold and the at least one wireless terminal is not handed over to another base station.

4. The method of claim 1, wherein the interference measurements comprise at least one of a first interference measurement for each of the plurality of white space channels, the first interference measurement being obtained by at least one receive antenna positioned at a height to obtain interference to wireless terminals; and a second interference measurement for each of the plurality of white space channels, the second interference measurement being obtained from the at least one neighboring base station through measurements of wireless terminals served by the at least one neighboring base station.

5. The method of claim 4, wherein said height is about two meters.

6. The method of claim 1, wherein creating a list of candidate white space channels based on the obtained information comprises:
   sorting the white space channels in the list of candidate channels in an order based on the value rankings of the white space channels; and
   narrowing the list of candidate channels by removing white space channels from the list of candidate channels that are beyond a threshold.

7. The method of claim 6, wherein the backup channel is a highest arranged white space channel in the list of candidate channels.

8. An apparatus for wireless communication, comprising:
   means for obtaining information corresponding to, 1) for each of a plurality of neighboring base stations, a white space channel selected by the respective neighboring base station, and 2) interference measurements for each of the plurality of selected white space channels;

means for creating a list of candidate white space channels based on a value ranking for each of the plurality of selected white space channels, wherein the value ranking of a respective white space channel is based on the number of neighboring base stations that selected the respective white space channel and the interference measurements for the respective white space channel, and the list is in an order of interference or likelihood of causing interference;

means for selecting a backup channel from the list of candidate white space channels; and means for transitioning from the operational channel to the backup channel based on a predefined criteria by stopping the transmission on the operational channel and initiating a transmission on the backup channel.

9. The apparatus of claim 8, wherein the predefined criteria is satisfied when the operational channel is not in the list of candidate white space channels.

10. The apparatus of claim 8, further comprising means for receiving information from at least one wireless terminal on a signal quality related to the operational channel, wherein the predefined criteria is satisfied when the signal quality is below a threshold and the at least one wireless terminal is not handed over to another base station.

11. The apparatus of claim 8, wherein the interference measurements comprise at least one of a first interference measurement for each of the plurality of white space channels, the first interference measurement being obtained by at least one receive antenna positioned at a height to obtain interference to wireless terminals; and a second interference measurement for each of the plurality of white space channels, the second interference measurement being obtained from the at least one neighboring base station through measurements of wireless terminals served by the at least one neighboring base station.

12. The apparatus of claim 11, wherein said height is about two meters.

13. The apparatus of claim 8, wherein the means for creating a list of candidate white space channels based on the obtained information comprises:

means for sorting the white space channels in the list of candidate channels in an order based on the value rankings of the white space channels; and means for narrowing the list of candidate channels by removing white space channels from the list of candidate channels that are beyond a threshold.

14. The apparatus of claim 13, wherein the backup channel is a highest arranged white space channel in the list of candidate channels.

15. A computer program product for a base station, comprising:

a non-transitory computer-readable medium comprising code for:

obtaining information corresponding to, 1) for each of a plurality of neighboring base stations, a white space channel selected by the respective neighboring base station, and 2) interference measurements for each of the plurality of selected white space channels;

creating a list of candidate white space channels based on a value ranking for each of the plurality of selected white space channels, wherein the value ranking of a respective white space channel is based on the number of neighboring base stations that selected the respective white space channel and the interference measurements for the respective white space channel, and the list is in an order of interference or likelihood of causing interference;

selecting a backup channel from the list of candidate white space channels; and transitioning from the operational channel to the backup channel based on a predefined criteria by stopping the transmission on the operational channel and initiating a transmission on the backup channel.

16. An apparatus for wireless communication, comprising:

a processing system configured to:

obtain information corresponding to, 1) for each of a plurality of neighboring base stations, a white space channel selected by the respective neighboring base station, and 2) interference measurements for each of the plurality of selected white space channels;

creating a list of candidate white space channels based on a value ranking for each of the plurality of selected white space channels, wherein the value ranking of a respective white space channel is based on the number of neighboring base stations that selected the respective white space channel and the interference measurements for the respective white space channel, and the list is in an order of interference or likelihood of causing interference;

select a backup channel from the list of candidate white space channels; and transition from the operational channel to the backup channel based on a predefined criteria by stopping the transmission on the operational channel and initiating a transmission on the backup channel.

* * * * *